(12) United States Patent
Zhu et al.

(10) Patent No.: US 9,623,872 B2
(45) Date of Patent: Apr. 18, 2017

(54) CONTROLLING APPARATUS AND METHOD FOR ELECTRIC DRIVE TRANSMISSION OF DUAL-MOTOR ELECTRIC VEHICLE

(71) Applicant: SAIC Motor Corporation Limited, Shanghai (CN)

(72) Inventors: Jun Zhu, Shanghai (CN); Chengjie Ma, Shanghai (CN); Zhengmin Gu, Shanghai (CN); Xianjun Ye, Shanghai (CN); Pengjun Zhang, Shanghai (CN); Peng Zhang, Shanghai (CN); Jing Gu, Shanghai (CN)

(73) Assignee: SAIC Motor Corporation Limited, Shanghai (CN)

( * ) Notice: Subject to any disclaimer, the term of this patent is extended or adjusted under 35 U.S.C. 154(b) by 0 days.

(21) Appl. No.: 14/948,034

(22) Filed: Nov. 20, 2015

(65) Prior Publication Data

US 2016/0347320 A1 Dec. 1, 2016

(30) Foreign Application Priority Data

May 29, 2015 (CN) .......................... 2015 1 0287526

(51) Int. Cl.
*B60W 10/08* (2006.01)
*B60W 30/188* (2012.01)
(Continued)

(52) U.S. Cl.
CPC .......... *B60W 30/1882* (2013.01); *B60K 1/02* (2013.01); *B60L 15/2054* (2013.01);
(Continued)

(58) Field of Classification Search
None
See application file for complete search history.

(56) References Cited

U.S. PATENT DOCUMENTS

| 4,584,892 A | 4/1986 | Hiraiwa et al. |
| 5,106,352 A | 4/1992 | Lepelletier |
(Continued)

FOREIGN PATENT DOCUMENTS

| CN | 101875298 A | 11/2010 |
| CN | 102490585 A | 6/2012 |
(Continued)

OTHER PUBLICATIONS

U.S. Appl. No. 14/947,979, filed Nov. 20, 2015, inventors: Hongxiang Leng, Wen Li, Jun Sun, Xinhua Jiang, Feifei Zhang, Sidong Luo, and Hailong Ge.
(Continued)

*Primary Examiner* — Justin Holmes
(74) *Attorney, Agent, or Firm* — McDonnell Boehnen Hulbert & Berghoff LLP (57) ABSTRACT

A controlling apparatus and method for an electric drive transmission used in a dual-motor electric vehicle are disclosed, wherein when the second motor is in the zero torque state, the synchronizer is shifted to a neutral position, the second motor the required torque being kept to be zero; after shifted to the neutral position, if the target gear position is the neutral position, gearshifting is completed, an if the target gear position is not the neutral position, speed control to the second motor is conducted to adjust its speed towards a target speed; once the second motor is adjusted to the target speed, the second motor is subjected to zero torque control, the second motor the required torque being zero; once the second motor comes into a zero torque state, the synchronizer is shifted to a target gear position, the required torque of the second motor being kept to be zero; once the synchronizer is located in the target gear position, the required torque of the second motor changes towards a target value at a proper changing rate; once the second motor real torque (Continued)

and is equal to or larger than target torque, gearshifting is judged as completed. Loss in wheel driving torque caused by the second motor in the whole gearshifting procedure is compensated by the first motor, so that gearshifting without power interruption can be achieved.

13 Claims, 4 Drawing Sheets (51) Int. Cl.
*B60K 1/02* (2006.01)
*B60L 15/20* (2006.01)
*B60W 10/11* (2012.01)
*F16H 61/04* (2006.01)

(52) U.S. Cl.
CPC .......... *B60W 10/08* (2013.01); *B60W 10/11* (2013.01); *B60W 30/188* (2013.01); *F16H 61/0403* (2013.01); *B60L 2220/42* (2013.01); *B60W 2510/081* (2013.01); *B60W 2510/083* (2013.01); *B60W 2510/101* (2013.01); *B60W 2510/1005* (2013.01); *B60W 2710/081* (2013.01); *B60W 2710/083* (2013.01); *B60W 2710/1005* (2013.01); *F16H 2061/0422* (2013.01)

(56) References Cited

U.S. PATENT DOCUMENTS

| | | | |
|---|---|---|---|
| 5,425,283 A | 6/1995 | Wehking | |
| 5,558,595 A | 9/1996 | Schmidt et al. | |
| 5,789,823 A | 8/1998 | Sherman | |
| 6,019,697 A | 2/2000 | Colletti | |
| 6,592,484 B1 | 7/2003 | Tsai et al. | |
| 6,886,424 B2 | 5/2005 | Janson et al. | |
| 7,597,020 B2 | 10/2009 | Baldwin | |
| 7,611,433 B2 | 11/2009 | Forsyth et al. | |
| 7,895,910 B2 | 3/2011 | Caenazzo et al. | |
| 8,109,167 B2 | 2/2012 | Mohlin et al. | |
| 8,333,126 B2 | 12/2012 | Enstroem et al. | |
| 8,444,519 B2 | 5/2013 | Borntraeger et al. | |
| 8,549,959 B2 | 10/2013 | Kasuya et al. | |
| 8,672,109 B2 | 3/2014 | Quartier et al. | |
| 8,672,803 B2 | 3/2014 | Tamba et al. | |
| 8,677,847 B2 | 3/2014 | Diani et al. | |
| 8,689,655 B2 | 4/2014 | Diani et al. | |
| 8,714,287 B2 | 5/2014 | Kim et al. | |
| 8,727,939 B2 | 5/2014 | Chen et al. | |
| 8,763,485 B2 | 7/2014 | Thomas | |
| 8,771,136 B2 | 7/2014 | Miller et al. | |
| 8,784,249 B2 | 7/2014 | Motodohi et al. | |
| 2001/0051556 A1 | 12/2001 | Takenaka | |
| 2004/0251064 A1 | 12/2004 | Imai | |
| 2004/0251862 A1 | 12/2004 | Imai | |
| 2009/0118914 A1* | 5/2009 | Schwenke | B60K 6/445 701/51 |
| 2009/0199666 A1 | 8/2009 | Yang et al. | |
| 2010/0276218 A1 | 11/2010 | Thompson et al. | |
| 2010/0311540 A1 | 12/2010 | Hellenbroich | |
| 2011/0239820 A1 | 10/2011 | Shibahata | |
| 2012/0104904 A1 | 5/2012 | Abiko et al. | |
| 2013/0035203 A1* | 2/2013 | Arakawa | B60K 7/0007 477/5 |
| 2013/0184111 A1 | 7/2013 | Tsuchida et al. | |
| 2014/0011631 A1 | 1/2014 | Cimatti | |
| 2016/0009269 A1 | 1/2016 | Zhou et al. | |
| 2016/0137045 A1 | 5/2016 | Zhu et al. | |
| 2016/0137048 A1 | 5/2016 | Zhu et al. | |
| 2016/0137049 A1 | 5/2016 | Zhu et al. | |
| 2016/0137188 A1 | 5/2016 | Zhu et al. | |
| 2016/0137189 A1 | 5/2016 | Zhu et al. | |

FOREIGN PATENT DOCUMENTS

| | | |
|---|---|---|
| CN | 103072474 A | 5/2013 |
| CN | 103332100 A | 10/2013 |
| CN | 103552461 A | 2/2014 |
| EP | 1690723 A2 | 8/2006 |
| JP | 2009107626 A | 5/2009 |
| WO | 2008/138387 A1 | 11/2008 |

OTHER PUBLICATIONS

Ioan-Adrian Viorel; et al.; Integrated Starter-Generators for Automotive Applications, ACTA Electrotehnica, vol. 45, No. 3, Sep. 2004, pp. 255-260.

Nate Martinez, Motor Trend Canada, First Drive: 2012 Infiniti M35 Hybrid—Fashionably Late: Infinity Finally RSVPs for Upscale Hybrid Party, Aug. 4, 2010, 18 pages.

Iskra Avtoelektrika d.d.; Integrated Starter Motor Generators; Mar. 2008, 8 pages.

* cited by examiner

CONTROLLING APPARATUS AND METHOD FOR ELECTRIC DRIVE TRANSMISSION OF DUAL-MOTOR ELECTRIC VEHICLE

TECHNICAL FIELD

The disclosure relates to a controlling apparatus and method for an electric drive transmission used in a dual-motor electric vehicle.

BACKGROUND ART

In current pure electric vehicles, a transmission with two or more gear ratios is generally used for meeting requirements on dynamic performance at low speed and economics at high speed. When a mechanical type automated manual transmission (AMT) configuration is used in a gear shifting mechanism of a pure electric vehicle, power interruption occurs during gearshifting, so driving sense is not good. On the other hand, when an electric drive transmission is used, it is not feasible to give consideration at the same time to eliminating power interruption during gearshifting and optimizing motor working points in a relatively large range.

SUMMARY OF THE DISCLOSURE

In view of state of the prior art, an object of the disclosure is to provide an improved control strategy for an electric drive transmission used in a dual-motor electric vehicle so that no power interruption occurs during gearshifting, and at the same time, it is possible to optimizing dual motor working points in a relatively large range.

In order to achieve this object, according to one aspect of the disclosure, there provides a controlling apparatus for an electric drive transmission used in a dual-motor electric vehicle, wherein the dual motors comprises first and second motors, the electric drive transmission is coupled with the first and second motors in a way that the first motor outputs power with a single gear, and the second motor selectively outputs power with two gears by means of a single synchronizer, and the controlling apparatus is configured to receive information sent from a vehicle controller, to control operations of the first and second motors and the electric drive transmission, and to perform gearshifting operation of the synchronizer by the steps of:
(1) the controlling apparatus starts to intervene in torque distribution of the vehicle controller;
(2) when the second motor is in a zero torque state, the synchronizer is shifted to a neutral position, and in this stage, the required torque of the second motor keeps to be zero;
(3) after the synchronizer is shifted to the neutral position, if the target gear position is the neutral position, the gearshifting procedure is completed, and if the target gear position is not the neutral position, speed control to the second motor is conducted to adjust its speed towards a target speed;
(4) once the speed of the second motor has been adjusted to the target speed, the second motor is subjected to zero torque control, the required torque of the second motor being zero;
(5) once the second motor comes into a zero torque state, the synchronizer starts to be shifted to the target gear position, and in this stage, the required torque of the second motor keeps to be zero;
(6) once the synchronizer is located in the target gear position, the required torque of the second motor changes towards a target value at a proper changing rate;
(7) when the real torque of the second motor and is equal to or larger than target torque, the gearshifting procedure is judged as completed.

According to a possible embodiment of the disclosure, in Step (1), the required torque of the second motor changes towards zero torque at a proper changing rate, and at the same time, the torque of the first motor changes towards a target value of the required torque of the first motor which is calculated based on a required torque of the whole vehicle at wheel; and when the second motor is in the zero torque state, the first motor keeps its target value of the required torque to support the power requirement of the whole vehicle.

According to a possible embodiment of the disclosure, in Step (6), the target value of the required torque of the second motor is a required torque that the vehicle controller distributed to the second motor based on the operation mode of the transmission.

According to a possible embodiment of the disclosure, the vehicle controller performs optimization to working points of the first and second motors with a synchronized transmission efficiency of the first and second motors as the optimization objective, to determine the required torques of the first and second motors.

According to a possible embodiment of the disclosure, in Step (7), after the gearshifting procedure is judged as completed, the controlling apparatus ends its intervention in torque distribution of the vehicle controller.

According to a possible embodiment of the disclosure, the controlling apparatus is configured to control the first and second motors and the electric drive transmission so that they operate in the operation modes of:
a disconnect mode in which the synchronizer is in its neutral position, and the first and second motors are both in a standby state;
a first-motor-only driving mode in which the synchronizer is in the neutral position, the first motor is in a torque control state conducted by the controlling apparatus, and the second motor is in a standby state or in a speed control state or a zero torque control state conducted by the controlling apparatus; and
a both-motors driving mode in which the synchronizer is in a first-gear or second-gear position, the first motor is in a torque control state conducted by the controlling apparatus, and the second motor is in a standby state or in a speed control or a torque control state conducted by the controlling apparatus.

According to a possible embodiment of the disclosure, in the first-motor-only driving mode, when there is no demand on shifting the synchronizer to the first-gear or second-gear position from the neutral position, the second motor operates in its standby state; when the synchronizer is in a speed synchronization stage for shifting towards the first-gear or second-gear position from the neutral position, the second motor operates in a speed control state; and when the synchronizer is in a stage from the time that the speed synchronization for shifting towards the first-gear or second-gear position from the neutral position is completed until the completion of gearshifting, the second motor is in the zero torque control state.

According to a possible embodiment of the disclosure, in the both-motors driving mode, the speed control of the second motor occurs in a speed synchronization stage during the procedure of shifting the synchronizer between the first-gear position and the second-gear position.

According to a possible embodiment of the disclosure, the controlling apparatus is configured to conduct switching between operation modes based on mode switching conditions Condition0 to Condition6 which are defined as:
Condition0: when the system operates in a power on state, unconditionally enters the disconnect mode;
Condition1: any one of the following subcondition (1), subcondition (2) and subcondition (3) is met, and it is not in the gearshifting procedure:
subcondition (1)—the gearshifting lever is in R position;
subcondition (2)—the gearshifting lever is in N position;
subcondition (3)—the gearshifting lever is in D position, and it is not beneficial for the second motor to participate in driving in either the first gear or the second gear;
under condition Condition1, switching to first-motor-only driving mode from the disconnect mode is to be conducted;
Condition2: the gearshifting lever is in P position;
under condition Condition2, switching to the disconnect mode from first-motor-only driving mode is to be conducted;
Condition3: the gearshifting lever is in D position, and it is beneficial for the second motor to participate in driving in either the first gear or the second gear, and it is not in the gearshifting procedure;
under condition Condition3, switching to both-motors driving mode from the disconnect mode is to be conducted;
Condition4: the same as Condition2; under condition Condition4, switching to the disconnect mode from both-motors driving mode is to be conducted;
Condition5: the same as Condition3; under condition Condition5, switching to both-motors driving mode from first-motor-only driving mode is to be conducted;
Condition6: the same as Condition1; under condition Condition6, switching to first-motor-only driving mode from both-motors driving mode is to be conducted.

According to a possible embodiment of the disclosure, the controlling apparatus is configured to judge the target gear position of the synchronizer based on the operation modes, and to determine to conduct gearshifting when one of conditions Switch0 to Switch6 defined below is met:
Switch0: when the system operates in a power on state, unconditionally enters the neutral state;
Switch1: the gearshifting lever is in D position, and it is beneficial for the second motor to participate in driving in the first gear;
under condition Switch1, shifting to the first gear from the neutral position is to be conducted;
Switch2: either of the following subcondition (1) and subcondition (2) is met:
subcondition (1)—the gearshifting lever is not in D position;
subcondition (2)—the gearshifting lever is in D position, and it is not beneficial for the second motor to participate in driving in either the first gear or the second gear;
under condition Switch2, shifting to the neutral position from first gear is to be conducted;
Switch3: the gearshifting lever is in D position, and it is beneficial for the second motor to participate in driving in the second gear;
under condition Switch3, shifting to second gear from the neutral position is to be conducted; Switch4: the same as Switch2;
under condition Switch4, shifting to the neutral position from second gear is to be conducted;
Switch5: the same as Switch3;
under condition Switch5, shifting to second gear from first gear is to be conducted;
Switch6: the same as Switch1;
under condition Switch6, shifting to first gear from second gear is to be conducted.

According to a possible embodiment of the disclosure, in Step (5), when the switching action of the synchronizer towards the target gear position becomes overtime, the synchronizer is moved back to the neutral position, and then the synchronizer is moved again towards the target gear position; and when the total number of the actions goes beyond a limited value, the synchronizer is prohibited from entering that target gear position.

According to a possible embodiment of the disclosure, the controlling apparatus comprises:
a first motor controller in communication with the vehicle controller for controlling the operation of the first motor;
a second motor controller in communication with the vehicle controller for controlling the operation of the second motor;
a gear shifting controller for controlling the selective action of the synchronizer to shift the transmission gear for the second motor; and
a transmission controller in communication with the vehicle controller and the gear shifting controller for determining expected working points of the first and second motors, and for controlling the first and second motor controllers via the vehicle controller and controlling directly the gear shifting controller.

The disclosure in another aspect provides a controlling method for an electric drive transmission used in a dual-motor electric vehicle, the method comprising the operations described above in relation to the controlling apparatus.

According to the disclosure, loss in wheel driving torque caused by the second motor in the whole gearshifting procedure is compensated by the first motor, so that gearshifting without power interruption can be achieved. By means of the disclosure, power outputs of the two driving motors and automatic gearshifting of the corresponding electric drive transmission can be coordinately controlled according to the power requirement of the whole vehicle of the pure electric vehicle, and at the meantime, optimizing motor working points in a relatively large range becomes possible.

DETAILED DESCRIPTION OF PREFERRED EMBODIMENTS

Some possible embodiments of the disclosure will be described now.

The disclosure relates to a controlling apparatus and corresponding controlling method for an electric drive transmission used in a pure electric vehicle driven by dual motors. The electric drive transmission allows one motor to output power via a single gear transmission path, and the other motor to output power via two gear transmission paths.

Figure 1:
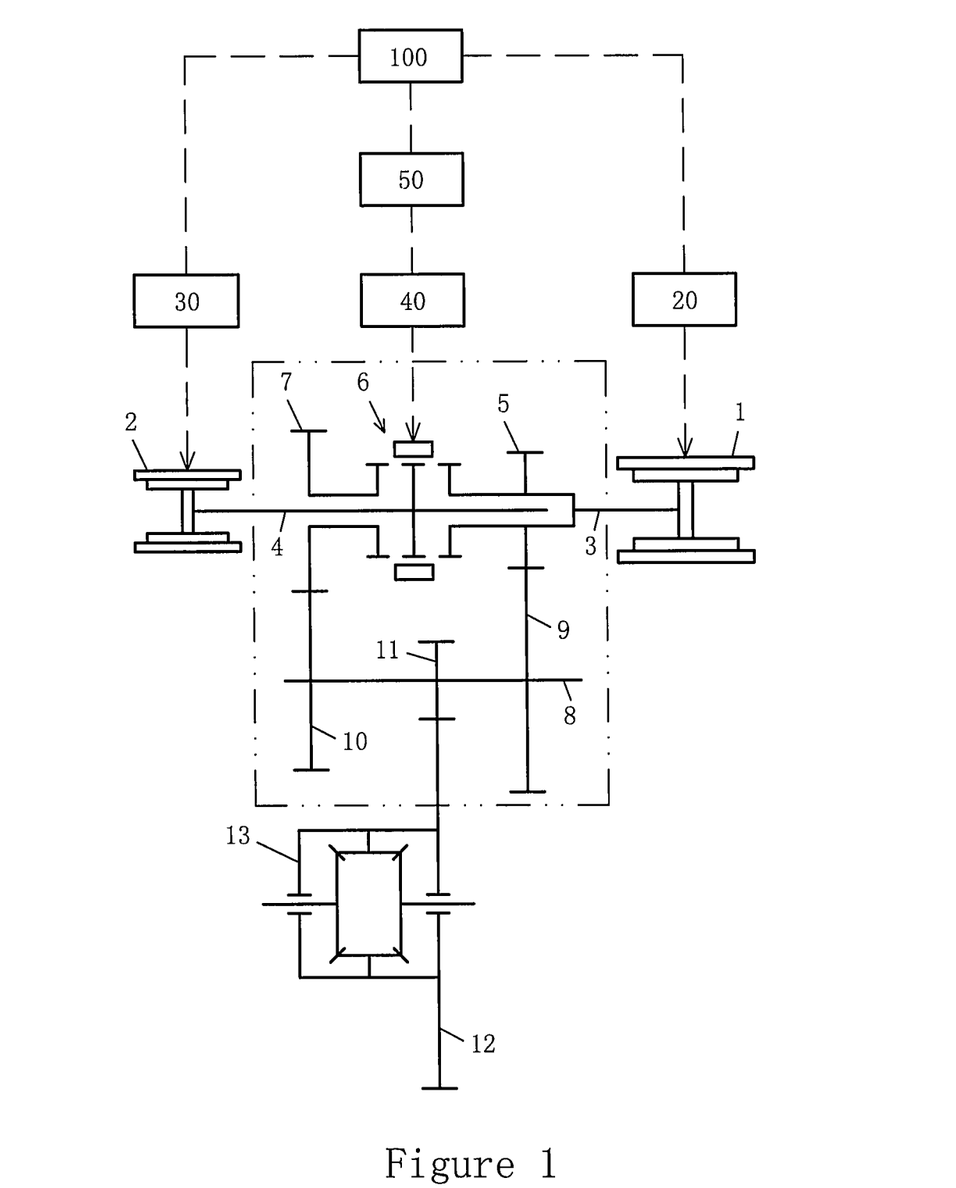
FIG. 1 is a schematic view of an electric drive transmission and its controlling apparatus for a dual-motor electric vehicle according to an embodiment of the disclosure.
Figure 2:
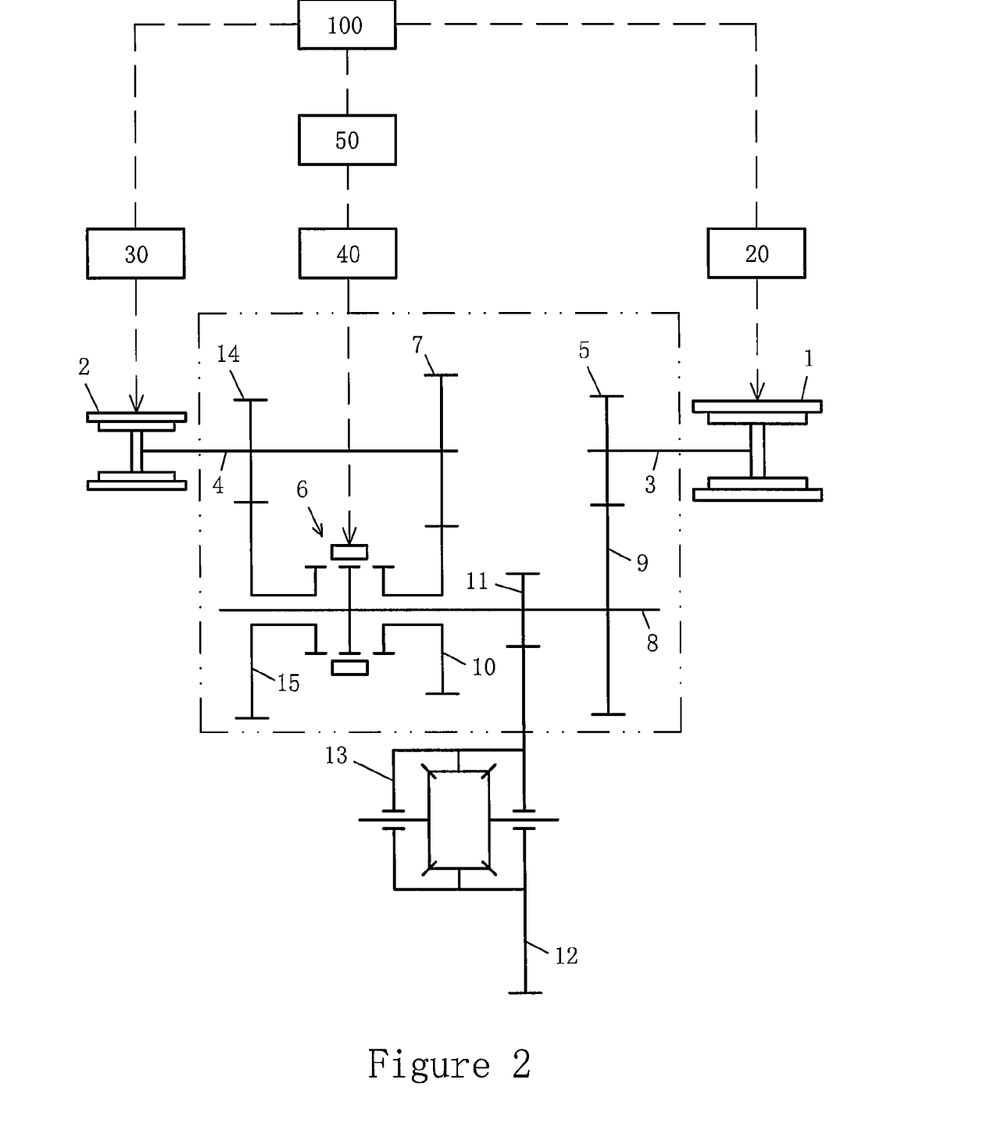
FIG. 2 is a schematic view of an electric drive transmission and its controlling apparatus for a dual-motor electric vehicle according to another embodiment of the disclosure.

FIGS. 1 and 2 show two embodiments of such an electric drive transmission; it can be understood that the basic concept of the disclosure is also applicable in controlling of any electric drive transmission of a dual-motor electric vehicle that meet the above requirements.

In the first embodiment shown in FIG. 1, an electric drive transmission for a dual-motor electric vehicle comprises a first motor 1 and a second motor 2, which are disposed opposite to each other.

Output power of the first motor 1 is transmitted to an intermediate shaft 8 with a single transmission ratio through a first-motor drive gearwheel 5 mounted on a first driving shaft 3 and a first-motor driven gearwheel 9 mounted on the intermediate shaft 8 and meshed with the first-motor drive gearwheel 5. Output power of the second motor 2 can be selectively transmitted to the intermediate shaft 8 either with a first transmission ratio or gear ratio (also the single transmission ratio of the first motor 1) through the first-motor drive gearwheel 5 and driven gearwheel 9, or with a second transmission ratio through a second-motor second-gear drive gearwheel 7 mounted around the second driving shaft 4 and a second-motor second-gear driven gearwheel 10 mounted on the intermediate shaft 8 and meshed with the second-motor second-gear drive gearwheel 7. A synchronizer 6 mounted on the second driving shaft 4 has a neutral position, a position engaged with the first-motor drive gearwheel 5 and a position engaged with the second-motor second-gear drive gearwheel 7. The power transmitted to the intermediate shaft 8 is then transmitted to a differential 13 through a main speed reduction pinion 11 and a main speed reduction gearwheel 12 engaged with the main speed reduction pinion 11. The main speed reduction pinion 11 and the main speed reduction gearwheel 12 form a main speed reducer.

The configuration described above, from the first driving shaft 3 and the second driving shaft 4 to the main speed reduction pinion 11, form the electric drive transmission according to the first embodiment, as indicated by double-dotted lines in FIG. 1. The synchronizer 6 is the only synchronizer in the electric drive transmission of the disclosure, for achieving the switching of the transmission paths of the second motor 2. In this transmission, the first motor 1 outputs power through a single power output path having a single transmission ratio, and the second motor 2 can output power through two power output paths with two gear ratios, wherein the second motor 2 in the first gear shares the same power output path with the first motor 1, and thus has a first transmission ratio which is the same as the single transmission ratio of the first motor 1, and in the second gear has a second transmission ratio which is different from the single transmission ratio or the first transmission ratio.

In the second embodiment shown in FIG. 2, an electric drive transmission for a dual-motor electric vehicle comprises a first motor 1 and a second motor 2. The first motor 1 drives the first driving shaft 3 to rotate, and the second motor 2 drives the second driving shaft 4 to rotate.

Output power of the first motor 1 is transmitted to an intermediate shaft 8 with a single transmission ratio through a first-motor drive gearwheel 5 mounted on the first driving shaft 3 and a first-motor driven gearwheel 9 mounted on the intermediate shaft 8 and engaged with the first-motor drive gearwheel 5. Output power of the second motor 2 can be selectively transmitted to the intermediate shaft 8 either with a first transmission ratio or gear ratio through a second-motor first-gear drive gearwheel 14 mounted on the second driving shaft 4 and a second-motor first-gear driven gearwheel 15 mounted around the intermediate shaft and meshed with the second-motor first-gear drive gearwheel 14, or with a second transmission ratio through a second-motor second-gear drive gearwheel 7 mounted on the second driving shaft 4 and a second-motor second-gear driven gearwheel 10 mounted around the intermediate shaft 8 and meshed with the second-motor second-gear drive gearwheel 7. A synchronizer 6 mounted on the intermediate shaft 8 has a neutral position, a position engaged with the second-motor first-gear driven gearwheel 15 and a position engaged with the second-motor second-gear driven gearwheel 10. The power transmitted to the intermediate shaft 8 is then transmitted to a differential 13 through a main speed reduction pinion 11 and a main speed reduction gearwheel 12 engaged with the main speed reduction pinion 11. The main speed reduction pinion 11 and the main speed reduction gearwheel 12 form a main speed reducer.

It can be understood that, as an alternative solution, the synchronizer 6 may be provided on the second driving shaft 4, and can be selectively engaged with the second-motor first-gear drive gearwheel 14 and the second-motor second-gear drive gearwheel 7 which in this case are both mounted around the second driving shaft 4.

The configuration described above, from the first driving shaft 3 and the second driving shaft 4 to the main speed reduction pinion 11, form the electric drive transmission according to the second embodiment, as indicated by double-dotted lines in FIG. 2. The synchronizer 6 is the only synchronizer in the electric drive transmission of the disclosure, for achieving the switching of the transmission paths of the second motor 2. In this transmission, the first motor 1 outputs power through a single power output path having a single transmission ratio, and the second motor 2 can output power through two power output paths with two gear ratios, wherein the second motor 2 in the first gear has a first transmission ratio or gear ratio, and in the second gear has a second transmission ratio which is different from the first transmission ratio. The first transmission ratio of the second motor may be different from the single transmission ratio of the first motor 1.

In addition, each of the electric drive transmissions according to the first and second embodiments as described above further comprises a controlling apparatus for controlling the transmission, the controlling apparatus comprising a first motor controller 20 for controlling the operation of the first motor 1, a second motor controller 30 for controlling the operation of the second motor 2, a gear shifting controller 40 for controlling the selective shift action of the synchronizer 6 for achieving the input of the power of the second motor 2 and gearshifting, a transmission controller (TCU) 50 for determining expected working points of the two motors, and sending corresponding instructions so that the first motor controller 20, the second motor controller 30 and the gear shifting controller 40 perform corresponding control operations, and a vehicle controller 100 for coordinatively controlling the two motors and other vehicle functionalities.

In the embodiments shown in FIGS. 1 and 2, the first motor controller 20 and the second motor controller 30 are in communication with the vehicle controller 100. When gearshifting is desired, the transmission controller 50 takes over the control right of the vehicle controller, and transfers target instructions on speed control and torque control of the second motor 2 and control targets of the torque of the first motor 1, all calculated by the transmission controller 50, to the first motor controller 20 and the second motor controller 30 via the vehicle controller 100. The gear shifting controller 40 is configured as a subsystem of the transmission controller 50, and is in communication with it.

A gearshifting procedure conducted in the transmission is described below: (1) the transmission controller 50 sends a torque control instruction to the second motor controller 30 via the vehicle controller 100, with a target torque of zero to which the torque should be changed from currently instructed torque at a proper changing rate. At the same time, the transmission controller 50 sends a torque control instruction to the first motor controller 20 via the vehicle controller 100, with a target torque calculated in the following way: subtracting the driving torque of the second motor at wheel from the required torque of the whole vehicle at wheel, and then the torque target of the first motor is calculated out according to currently engaged gear. In other words, the effect on the driving torque at wheel caused by the change in the torque of the second motor which is necessary for gearshifting is compensated by the first motor.

(2) When the second motor comes into a zero torque state, the transmission controller 50 sends a zero torque control instruction to the second motor controller 30 via the vehicle controller 100, and keeps this instruction.

When the real torque of the second motor which is fed back by the second motor controller 30 via the vehicle controller 100 approaches zero, the transmission controller 50 sends an instruction on moving a gearshifting fork of the synchronizer or a force applying instruction to the gear shifting controller 40, so that gearshifting is performed.

If the target gear position is the neutral position, gearshifting is completed after an engagement ring of the synchronizer is moved back to the neutral position.

If the target gear position is not the neutral position, once the engagement ring is moved back to the neutral position, the transmission controller 50 sends a synchronization state information to the gear shifting controller 40, with the target position being the target gear position, and at the same time, sends a target torque instruction to the first motor controller 20, and sends a target speed to the second motor controller 30, so that speed synchronization before and after the gearshifting of the second motor can be achieved.

In this stage, a torque control instruction is sent to the first motor controller 20 via the vehicle controller 100, and the driving torque of the whole vehicle at wheel is completely supplied by the first motor.

(3) Once the speed synchronization of the second motor is completed, a zero torque control instruction is sent to the second motor. After the second motor enters the zero torque state, the transmission controller 50 sends an instruction on moving the gearshifting fork or a force applying instruction to the gear shifting controller 40, so that the gearshifting fork pushes the engagement ring to be engaged with a gearing of the synchronizer disposed at the target gear position. After the engagement ring is engaged with the gearing disposed at the target gear position, the transmission controller 50 sends a gear keeping instruction to the gear shifting controller 40, and at the same time sends target torque instructions to the first motor controller 20 and the second motor controller 30 via the vehicle controller 100, until the real torques of the first and second motors come to their normal levels, or until the gearshifting is overtime. Then, gearshifting is ended.

In the whole gearshifting procedure, under the coordinate control of the transmission controller 50, not only the torque requirement of the whole vehicle at wheel can be met in real time, but also speed synchronization and gearshifting of the second motor can be carried out.

Thus, smooth gearshifting without power interruption can be achieved.

The above described controllers can exchange data their between via a CAN network or other communication means.

The transmission controller 50 may be an individual controller which is connected to and in communication with the vehicle controller 100; alternatively, the transmission controller 50 may be a module in the vehicle controller 100 which is connected to and in communication with other modules.

The gear shifting controller 40 may be provided with an actuation mechanism for driving the synchronizer 6 to move. For example, the actuation mechanism comprises a gearshifting motor, a worm-gear mechanism and a gearshifting fork. The worm-gear mechanism transforms the rotational movement of the gearshifting motor into a linear movement of the gearshifting fork, and transfers a gearshifting force of the gearshifting motor to the gearshifting fork, and the gearshifting fork drives the engagement ring of the synchronizer 6 to move to achieve gearshifting. It can be understood that other mechanisms, instead of the worm-gear mechanism, that can transform the rotational movement of the gearshifting motor into the linear movement of the gearshifting fork can also be used here.

The transmission controller 50 is configured for receiving information sent from the vehicle controller, and determining a torque intervention target of the two motors and a synchronizer position target, to achieve the gearshifting function without power interruption. In the electric drive transmission according to the first and second embodiments, the first motor 1 which is directly connected to the transmission path with the single transmission ratio acts as a main motor which provides driving power continuously during the running of the vehicle, and the second motor 2 acts as an assistant motor which provides assistant or individual driving when the required vehicle torque or power is high or the first motor has a low efficiency now. In the upshifting or downshifting action of the second motor 2, the first motor 1 continuously outputs power to prevent power interruption.

In the electric drive transmission according to the first and second embodiments, the transmission controller 50 is configured such that, when the vehicle is driven by the first motor 1, the second motor 2 may be selectively put into one of a neutral state and the first gear and second gear states by means of the synchronizer 6, so that the second motor 2 may intervene or not intervene in the vehicle driving; further, when the vehicle is driving by both motors, the synchronizer 6 may be shifted between the first-gear and second-gear positions, for facilitating the optimization of working points of the first motor 1 and of the second motor 2. The vehicle controller 100 may perform optimization to working points (speed and torque) of the first motor 1 and of the second motor 2 with a predetermined optimization objective, such as synchronized transmission efficiency.

A controlling method which is performed by the transmission controller 50 for controlling the transmission will be described now.

First, according to the electric drive transmission of the disclosure, a combination of operation states of a power transmission system formed by the first motor 1 (herebelow referred to as TM1), the second motor 2 (herebelow referred to as TM2) and the electric drive transmission and the engagement positions of the synchronizer is listed in Table 1.

TABLE 1

| Operation modes of the power transmission system: | Positions of the synchronizer: | Motor states: | |
| --- | --- | --- | --- |
| Disconnect (being disconnected) | Neutral position | TM1 standby | TM2 standby |
| T1 (driving by TM1 only) | Neutral position | TM1 torque control | TM2 standby or speed control or zero torque control |
| T2 Beneficial (driving by both motors) | First-gear position | TM1 torque control | TM2 torque control or speed control |
| | Second-gear position | TM1 torque control | TM2 torque control or speed control |

In addition, if the vehicle is equipped with a mechanical air conditioner, a configuration in which an electromagnetic clutch for the compressor of the air conditioner is connected to TM2 can be used. During parking or low speed driving of the vehicle, the synchronizer is controlled to be in the neutral position, so that the requirement of the compressor of the air conditioner, which is applied to the driving motor, at the lowest running speed of the compressor can be met. In this way, the air conditioner can work properly in the full speed range of the vehicle. During the operation of the air conditioner, when and the synchronizer needs to be shifted between its neutral position, the first-gear position and the second-gear position, the electromagnetic clutch for the compressor shall be disconnected at the beginning of gearshifting, and it may judge whether the electromagnetic clutch for the compressor shall be connected again after gearshifting is ended.

Figure 3:
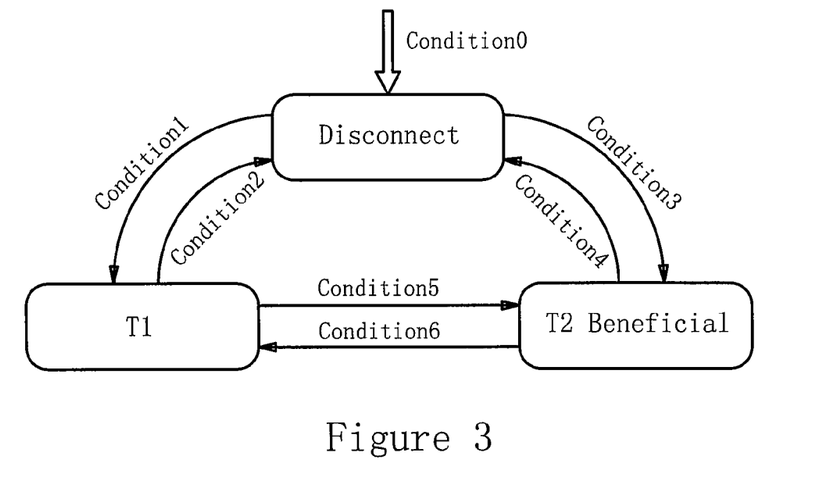
FIG. 3 is a flowchart of judging the operation modes of the electric drive transmission conducted in the controlling apparatus shown in FIGS. 1 and 2.

According to the motor states and the synchronizer positions listed in Table 1, the transmission controller 50 of the disclosure judges the operation mode of the electric drive transmission, a flowchart of this judgment being shown FIG. 3.

The electric drive transmission of the disclosure has three operation modes: Disconnect (being disconnected), T1 (driving by TM1 only) and T2 Beneficial (driving by both motors). Disconnect means that the two driving motors are both in a standby state (Standby). T1 means that only TM1 is working for driving, and it is in a torque control (Torque Control) state, while TM2 operates in a standby (Standby) or speed control (Speed Control) or zero torque control state. In this operation mode, if there is no demand on shifting the synchronizer to the first-gear or second-gear position from the neutral position, TM2 operates in its standby state; when the synchronizer is in a speed synchronization stage for shifting towards the first-gear or second-gear position from the neutral position, TM2 operates in a speed control state; and when the synchronizer is in a stage from the time that the speed synchronization for shifting towards the first-gear or second-gear position from the neutral position is completed to the completion of gearshifting, TM2 is in zero torque control state. T2 Beneficial means that, when TM1 is working for driving (under torque control), TM2 is also working for driving (under torque control or speed control). In this operation mode, the speed control of TM2 occurs in a speed synchronization stage when the synchronizer is shifted between the first-gear position and the second-gear position.

Conditions of switching between operation modes of the power transmission system can be judged based on the position (P, R, N, D) of the gearshifting lever and according to whether it is beneficial for TM2 participating in driving with first or second gear, which is determined according to requirements of the vehicle dynamic performance economics. Concrete judging logics will be described now.

FIG. 3 shows the conditions for switching between the three operation modes: Condition0 to Condition6, as described below.

Condition0: when the system operates in a power on state, unconditionally enters the disconnect mode (Disconnect);

Condition1: any one of the following subcondition (1), subcondition (2) and subcondition (3) is met, and it is not in the gearshifting procedure:

subcondition (1)—the gearshifting lever is in R position;

subcondition (2)—the gearshifting lever is in N position;

subcondition (3)—the gearshifting lever is in D position, and it is not beneficial for TM2 to participate in driving in either the first gear or the second gear.

Condition2: the gearshifting lever is in P position.

Condition3: the gearshifting lever is in D position, and it is beneficial for TM2 to participate in driving in either the first gear or the second gear, and it is not in the gearshifting procedure.

Condition4: the same as Condition2.

Condition5: the same as Condition3.

Condition6: the same as Condition1.

Under a certain operation mode, when any corresponding condition of Condition0 to Condition6 is met, the transmission controller conducts gearshifting operation.

In T1 operation mode, the power requirement of the whole vehicle (the driving power requirement of the whole vehicle depending on the pressed degree of the acceleration pedal of the brake pedal, or the electric braking force required by the braking energy regeneration system) is completely met by TM1. In T2 Beneficial operation mode, TM1 and TM2 in combination meet the power requirement of the whole vehicle, and the transmission controller may optimize working points of TM1 and TM2 according to the efficiency characteristics of TM1 and TM2 to improve the vehicle economics.

Figure 4:
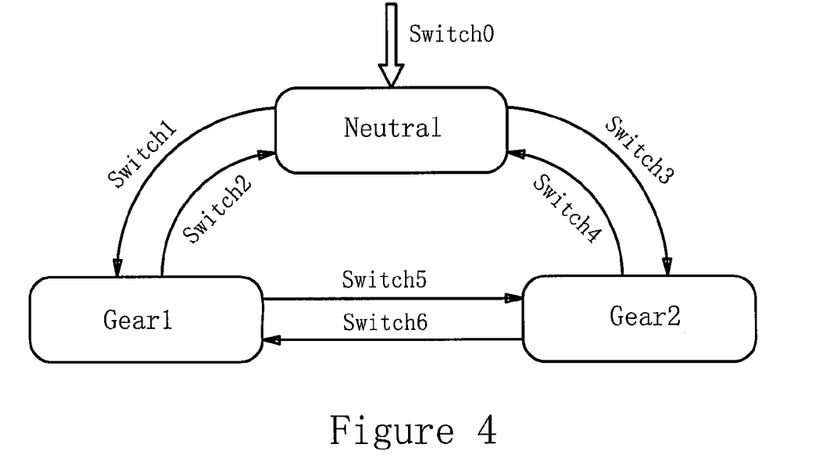
FIG. 4 is a flowchart of judging the target gear position of a synchronizer in the controlling apparatus shown in FIGS. 1 and 2.

Further, according to the motor states and the synchronizer positions listed in Table 1, the transmission controller judges the target gear position of the synchronizer, a flowchart of this judgment being shown FIG. 4.

The target gear positions controlled by the synchronizer comprises three positions: Neutral (neutral position), Gear1 (first-gear position) and Gear2 (second-gear position). Switching conditions between these positions are Switch0 to Switch6, as described below.

Switch0: when system operates in a power on state, unconditionally enters the neutral position state (Neutral).

Switch1: the gearshifting lever is in D position, and it is beneficial for TM2 to participate in driving in the first gear.

Switch2: either of the following subcondition (1) and subcondition (2) is met:
subcondition (1)—the gearshifting lever is not in D position;
subcondition (2)—the gearshifting lever is in D position, and it is not beneficial for TM2 to participate in driving in either the first gear or the second gear.
Switch3: the gearshifting lever is in D position, and it is beneficial for TM2 to participate in driving in the second gear.
Switch4: the same as Switch2.
Switch5: the same as Switch3.
Switch6: the same as Switch1.

When a corresponding condition of Switch0 to Switch6 is met, the transmission controller judges that gearshifting is necessary.

Figure 5:
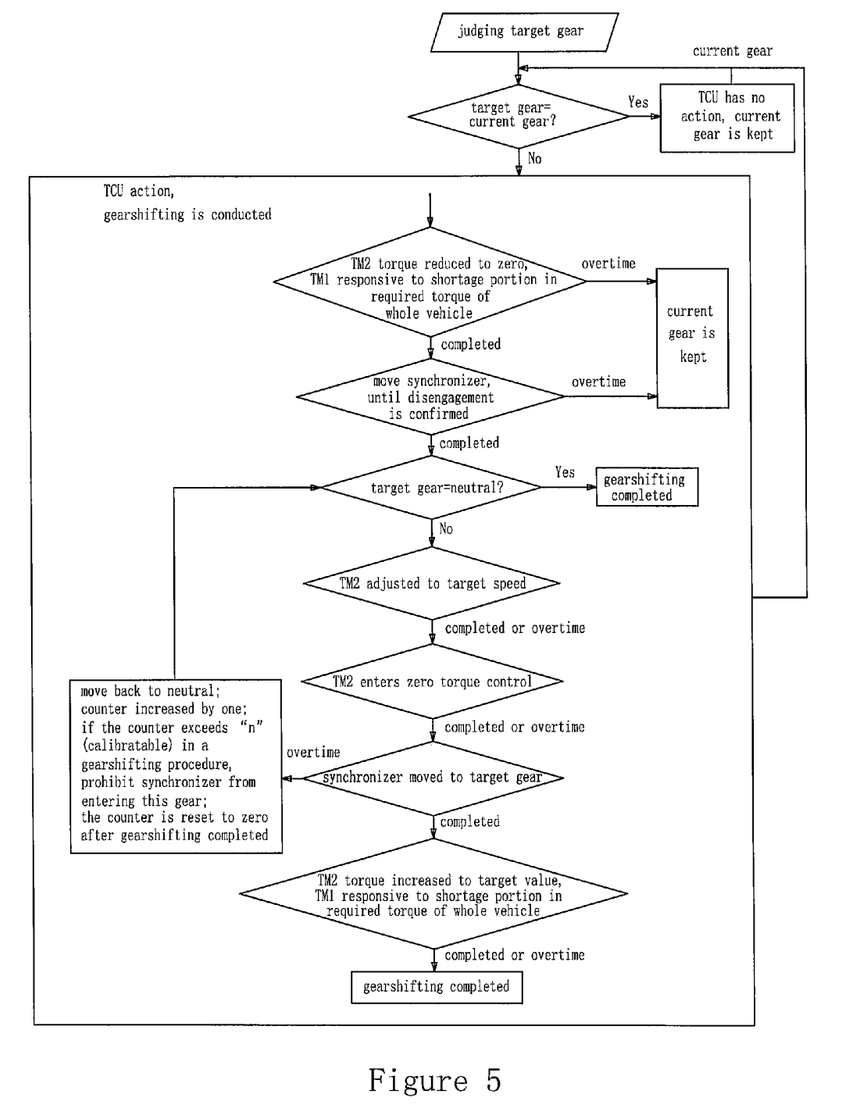
FIG. 5 is a flowchart of a gearshifting process of the electric drive transmission.

A complete gearshifting process performed by the transmission controller is shown in FIG. 5, the process comprising steps for judging whether gearshifting is necessary (as described above) and a gearshifting procedure that is concretely carried out after it is judged that gearshifting is necessary.

For achieving during gearshifting without power interruption, and for being responsive to the change of torque requirement caused by the operation of the acceleration pedal, the disclosure provide a gearshifting procedure as described below.

(1) The transmission controller starts to intervene in the torque distribution of the vehicle controller. The required torque of TM2 is changed to the target value zero torque at a proper changing rate, and at the same time, the required torque of TM1 is calculated by:

The required torque of TM1=(the required torque of the whole vehicle at wheel—the real torque of TM2$\times i_{b0} \times i_g$)/($i_{a0} \times i_g$)

wherein $i_g$ is the speed ratio of the main speed reducer; $i_{b0}$ is the speed ratio of the gearwheels involved in current gear of TM2; $i_{a0}$ is the speed ratio of the gearwheels involved in the gear of TM1.

(2) When TM2 is in a zero torque state, the synchronizer is shifted to a neutral position. In this stage, the required torque of TM2 keeps to be zero, the required torque of TM1 is the required torque of the whole vehicle at wheel/($i_{a0} \times i_g$).

(3) After the synchronizer is moved to the neutral position, if the target gear position is the neutral position, gearshifting is completed; and if the target gear position is not the neutral position, TM2 is subjected to speed control until its speed is adjusted to the target speed, wherein the target speed of TM2=the speed of the output shaft$\times i_{b0r} \times i_g$, in which $i_{b0r}$ is the speed ratio of the gearwheels involved in the target gear of TM2. The required torque of TM1 is the required torque of the whole vehicle at wheel/($i_{a0} \times i_g$).

(4) Once the speed of TM2 is adjusted to the target speed, TM2 is subjected to zero torque control, the required torque of TM2 being zero, and the required torque of TM1 being required torque of the whole vehicle at wheel/($i_{a0} \times i_g$).

(5) Once TM2 comes into a zero torque state, the synchronizer starts to be moved towards the target gear position. In this stage, the required torque of TM2 keeps to be zero, and the required torque of TM1 is the required torque of the whole vehicle at wheel/($i_{a0} \times i_g$).

In the stage of moving the synchronizer towards a target gear position, if the action of the synchronizer becomes overtime, the synchronizer is moved back to the neutral position, and the process goes back to Step (3). In the condition that the target gear position is not the neutral position, the gearshifting actions in above Steps (3)-(5) will be repeated, or the control states of corresponding torque and speed will be maintained. A maximum number of gearshifting actions "n" (calibratable) can be set for a gearshifting procedure. If the number of gearshifting actions exceeds "n" but gearshifting is still not success, then the synchronizer is prohibited from entering this target gear position.

(6) Once the synchronizer is located in the target gear position, the required torque of TM2 is changed to a target value at a proper changing rate, the target value being the required torque that the vehicle controller distributed to TM2 on the basis of the operation mode of the power transmission system, and the required torque of TM1=(the required torque of the whole vehicle at wheel—the real torque of TM2$\times i_{b0} \times i_g$)/($i_{a0} \times i_g$).

(7) When the real torque of TM2 is equal to or larger than the target torque, the gearshifting procedure is judged as completed, and the transmission controller ends its intervention in the torque distribution of the vehicle controller.

The gearshifting procedure performed by the transmission controller of the disclosure relates to judgment of target gear position, setting the time sequence for gearshifting, action of the synchronizer, and calculation of target instruction for speed control and torque control of TM2, and at the same time, TM1 is given its torque control target, so the torque requirement of the whole vehicle at wheel can be met, and smooth gearshifting without power interruption can be achieved.

According to the disclosure, the electric drive transmission for a dual-motor electric vehicle can be controlled for achieving driving by a single motor, driving by two motors, and smooth gearshifting during riving by two motors without power interruption. By means of combination of various operation modes, vehicle economics and dynamic performance are further optimized. Further, the torque coordinative control in the gearshifting procedure is characterized in that the loss in driving power of the whole vehicle caused by gearshifting of one of the motors is compensated by the other motor which is directly connected to the main speed reducer, which results in a more direct and stable torque coordinative control with respect to the traditional gearshifting in which gearshifting is performed by clutch to clutch actions. Thus, the gearshifting quality of the disclosure is higher than the gearshifting in traditional transmissions.

While the disclosure has been described here with reference to certain embodiments, the scope of the disclosure is not limited to the illustrated and described details. Rather, these details can be modified in various manners without departing from the basic concept of the disclosure.

The invention claimed is:

1. A controlling apparatus for an electric drive transmission used in a dual-motor electric vehicle, wherein dual motors of the electric vehicle comprise first and second motors, the electric drive transmission is coupled with the first and second motors in a way that the first motor outputs power with a single gear, and the second motor selectively outputs power with two gears by means of a single synchronizer, and the controlling apparatus is configured to receive information sent from a vehicle controller, to control operations of the first and second motors and the electric drive transmission, and to perform a gear-shifting procedure of the synchronizer by the steps of:
   (1) the controlling apparatus starts to intervene in torque distribution of the vehicle controller;
   (2) when the second motor is in a zero torque state, the synchronizer is shifted to a neutral position, and in this stage, the required torque of the second motor remains at zero;

(3) after the synchronizer is shifted to the neutral position, if a target gear position that the synchronizer is to be moved to is the neutral position, the gear-shifting procedure is completed, and if the target gear position is not the neutral position, speed control to the second motor is conducted to adjust its speed towards a target speed;

(4) once the speed of the second motor has been adjusted to the target speed, the second motor is subjected to zero torque control, the required torque of the second motor being zero;

(5) once the second motor comes into a zero torque state, the synchronizer starts to be shifted to the target gear position, and in this stage, the required torque of the second motor remains at zero;

(6) once the synchronizer is located in the target gear position, the required torque of the second motor changes towards a target value at a changing rate; and (7) when the second motor and has a real torque that is equal to or larger than a target torque, the gear-shifting procedure is judged as completed.

2. The controlling apparatus of claim 1, wherein in Step (1), the required torque of the second motor changes towards zero torque at a changing rate, and at the same time, the torque of the first motor changes towards a target value of the required torque of the first motor which is calculated based on a required torque of the dual-motor electric vehicle at wheel; and wherein when the second motor is in the zero torque state, the first motor keeps its target value of the required torque to support a power requirement of the dual-motor electric vehicle.

3. The controlling apparatus of claim 1, wherein in Step (6), the target value of the required torque of the second motor is a required torque that the vehicle controller distributed to the second motor based on a current operation mode of the transmission.

4. The controlling apparatus of claim 3, wherein the vehicle controller performs optimization to working points of the first and second motors with a synchronized transmission efficiency of the first and second motors as an optimization objective, to determine the required torques of the first and second motors.

5. The controlling apparatus of claim 1, wherein in Step (7), after the gear-shifting procedure is judged as completed, the controlling apparatus ends its intervention in torque distribution of the vehicle controller.

6. The controlling apparatus of claim 1, wherein the controlling apparatus is configured to control the first and second motors and the electric drive transmission so that they operate in operation modes of:

a disconnect mode in which the synchronizer is in the neutral position, and the first and second motors are both in a standby state;

a first-motor-only driving mode in which the synchronizer is in the neutral position, the first motor is in a torque control state conducted by the controlling apparatus, and the second motor is in a standby state or in a speed control state or a zero torque control state conducted by the controlling apparatus; and a both-motors driving mode in which the synchronizer is in a first-gear or second-gear position, the first motor is in a torque control state conducted by the controlling apparatus, and the second motor is in a standby state or in a speed control state or a torque control state conducted by the controlling apparatus.

7. The controlling apparatus of claim 6, wherein in the first-motor-only driving mode, when there is no demand on shifting the synchronizer to the first-gear or second-gear position from the neutral position, the second motor operates in its standby state; when the synchronizer is in a speed synchronization stage for shifting towards the first-gear or second-gear position from the neutral position, the second motor operates in a speed control state; and when the synchronizer is in a stage from the time that the speed synchronization for shifting towards the first-gear or second-gear position from the neutral position is completed until the completion of gear-shifting, the second motor is in the zero torque control state.

8. The controlling apparatus of claim 6, wherein in the both-motors driving mode, the speed control of the second motor occurs in a speed synchronization stage during the procedure of shifting the synchronizer between the first-gear position and the second-gear position.

9. The controlling apparatus of claim 6, wherein the controlling apparatus is configured to conduct switching between the operation modes based on mode switching conditions Condition0 to Condition6 which are defined as:

Condition0: when a power transmission system comprising the electric drive transmission, the first motor, and the second motor operates in a power on state, unconditionally enters the disconnect mode;

Condition1: any one of the following sub-condition (1), sub: condition (2) and sub-condition (3) is met, and it is not in the gear-shifting procedure:

sub-condition (1): a gear-shifting lever is in an R position;

sub-condition (2): the gear-shifting lever is in an N position;

sub-condition (3): the gear-shifting lever is in a D position, and it is not desired for the second motor to participate in driving in either the first-gear or second-gear position;

under condition Condition1, switching to first-motor-only driving mode from the disconnect mode is to be conducted;

Condition2: the gear-shifting lever is in P position; under condition Condition2, switching to the disconnect mode from first-motor-only driving mode is to be conducted;

Condition3: the gear-shifting lever is in the D position, and it is desired for the second motor to participate in driving in either the first-gear or second-gear position, and it is not in the gear-shifting procedure;

under condition Condition3, switching to both-motors driving mode from the disconnect mode is to be conducted;

Condition4: the same as Condition2; under condition Condition4, switching to the disconnect mode from both-motors driving mode is to be conducted;

Condition5: the same as Condition3; under condition Condition5, switching to both-motors driving mode from first-motor-only driving mode is to be conducted;

Condition6: the same as Condition1; under condition Condition6, switching to first-motor-only driving mode from both-motors driving mode is to be conducted.

10. The controlling apparatus of claim 6, wherein the controlling apparatus is configured to judge the target gear position of the synchronizer based on the operation modes, and to determine to conduct gear-shifting when one of conditions Switch0 to Switch6 defined below is met:

Switch0: when a power transmission system comprising the electric drive transmission, the first motor, and the second motor operates in a power on state, unconditionally enters a neutral state;

Switch1: the gear-shifting lever is in a D position, and it is desired for the second motor to participate in driving in the first-gear position;

under condition Switch1, shifting to the first-gear position from the neutral position is to be conducted;

Switch2: either of the following sub-condition (1) and sub-condition (2) is met:
  sub-condition (1): the gear-shifting lever is not in the D position;
  sub-condition (2): the gear-shifting lever is in the D position, and it is not desired for the second motor to participate in driving in either the first-gear or second-gear position;

under condition Switch2, shifting to the neutral position from the first-gear position is to be conducted;

Switch3: the gear-shifting lever is in the D position, and it is desired for the second motor to participate in driving in the second-gear position;

under condition Switch3, shifting to the second-gear position from the neutral position is to be conducted;

Switch4: either of the sub-condition (1) and the sub-condition (2) is met and shifting of the synchronizer to the neutral position from the second-gear position is to be conducted;

Switch5: the gear-shifting lever is in the D position, and it is desired for the second motor to participate in driving in the second-gear position, and shifting of the synchronizer to the second-gear position from the first-gear position is to be conducted;

Switch6: the gear-shifting lever is in the D position, and it is desired for the second motor to participate in driving in the first-gear position and under condition Switch6, shifting to the first-gear position from the second-gear position is to be conducted.

11. The controlling apparatus of claim 10, wherein in Step (5), when a shifting action of the synchronizer towards the target gear position is not finished within a predetermined time period, the synchronizer is moved back to the neutral position, and then the synchronizer is moved again towards the target gear position; and when the total number of the actions goes beyond a limited value, the synchronizer is prohibited from entering the target gear position.

12. The controlling apparatus of claim 11, wherein the controlling apparatus comprises:
  a first motor controller in communication with the vehicle controller for controlling the operation of the first motor;
  a second motor controller in communication with the vehicle controller for controlling the operation of the second motor;
  a gear shifting controller for controlling the gear-shifting procedure of the synchronizer to shift gears for the second motor; and
  a transmission controller in communication with the vehicle controller and the gear shifting controller for determining expected working points of the first and second motors, and for controlling the first and second motor controllers via the vehicle controller and controlling directly the gear shifting controller.

13. A controlling method for an electric drive transmission used in a dual-motor electric vehicle, comprising the operations related with the controlling apparatus of claim 12.

* * * * *